Oct. 4, 1960  E. T. CARLSON  2,955,147
BUS DUCT
Filed Feb. 8, 1960

INVENTOR
ELMER T. CARLSON
BY
ATTORNEYS

United States Patent Office 2,955,147
Patented Oct. 4, 1960

2,955,147

BUS DUCT

Elmer T. Carlson, Center Valley, Pa., assignor to Electric Distribution Products, Inc., Allentown, Pa., a corporation of Delaware Filed Feb. 8, 1960, Ser. No. 7,470

4 Claims. (Cl. 174—68)

The present invention relates to bus ducts or busways of the character which are used for electric power distribution in industrial plants, buildings and the like.

A purpose of the invention is to obtain balance of voltage everywhere along a bus run by positioning a neutral bus bar system in fixed close proximity to all phases, and avoiding transposition of the neutral with respect to the phases.

A further purpose is to provide a neutral equalizer bar or conductor between each pair of phase bus bars, and to connect each neutral equalizer bar or conductor to a neutral plug-in bar or conductor adjacent each end of a bus duct section.

A further purpose is to interrupt the neutral plug-in bars or conductors adjacent one end of each section so as to divert current through the neutral equalizer bars or conductors.

Further purposes appear in the specification and in the claims.

In the drawings I have chosen to illustrate one only of the numerous embodiments in which the invention may appear, selecting the forms shown from the standpoints of convenience in illustration, satisfactory operation and clear demonstration of the principles involved.

Figure 1:
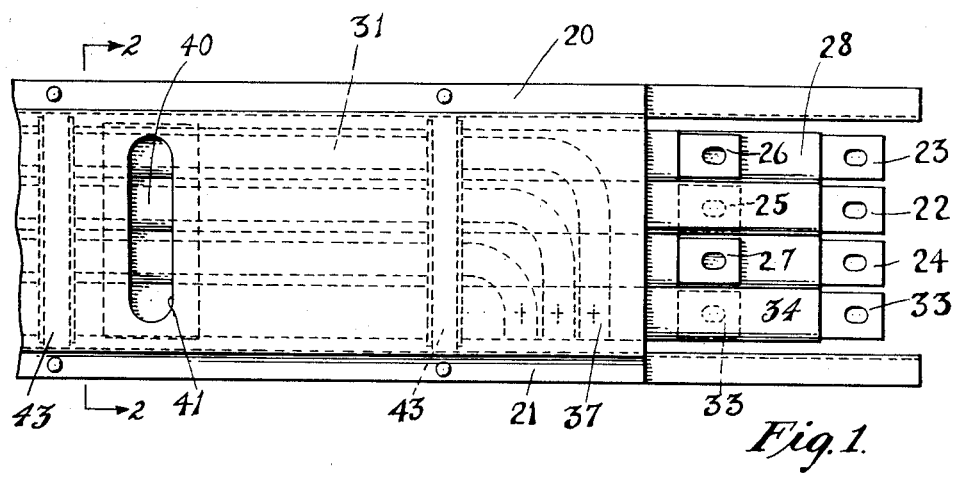
Figure 1 is a fragmentary side elevation of a bus duct in accordance with the invention showing particularly one end.

Considerable difficulty has been encountered in the prior art in overcoming the unbalance between phase to neutral along the length of a polyphase or multiphase bus system. When reference is made herein to polyphase it is intended to include multiphase.

In prior art practice transposition has commonly been used. In a system which is transposed, the balance between phases and neutral varies at different points along the system. While this may be satisfactory in a system which will connect to load only at the end, it is unsatisfactory in a bus run where plug-in can be made at any of a variety of points along the length.

The present invention is designed to produce equal phase-to-neutral voltages when measured at any of a variety of points along the length of a bus run. In accordance with the invention there is no transposition employed. Instead the neutral is located everywhere in close proximity to all phases, and a neutral plug-in bus bar is provided to permit plug-in to the neutral at all plug-in positions along the bus duct.

Accordingly a plug-in connection can be made with assurance that the phases will be balanced to neutral at the desired plug-in point.

In accordance with the invention a neutral equalizer bar is placed between each pair of phase bus bars located in different planes, and these neutral equalizer bus bars are connected to the neutral plug-in bus bars adjacent the ends of the bus bar section.

Furthermore, in the preferred embodiment the neutral plug-in bus bars are separated adjoining one end so as to divert current through the neutral equalizer bus bars.

Considering now the drawings in detail, I illustrate a busway or bus duct section 20 consisting of a suitable metallic housing 21 which may be of the character well known in the art which contains running longitudinally thereof in spaced relation a plurality of bus bars. It is believed that the widest application of the present invention will be in 3-phase alternating current systems, and accordingly the invention is being described in particular relation to 3-phase systems, although it will be evident that the principles of the invention can be applied to polyphase systems generally.

The phase bus bars are arranged side by side in two planes, and there are adjoining bus bars in each plane. Thus, for example phase 1 includes bus bars 22 and 23. Phase 2 includes bus bars 24 and 25. Phase 3 includes bus bars 26 and 27.

Each of the phase bus bars is covered with an insulating wrapping 28, and sheets of insulation extend at 30 around the phase bus bars and in some places between them. The detail of the arrangement of the insulation is unimportant from the standpoint of the present invention.

Between each bus bar in the different planes is placed one of the neutral equalizer bus bars 31, the neutral equalizer bus bars being covered with insulation 32 which further protects against any short circuit between the neutral equalizer bus bars and the phase bus bars.

Figure 3:
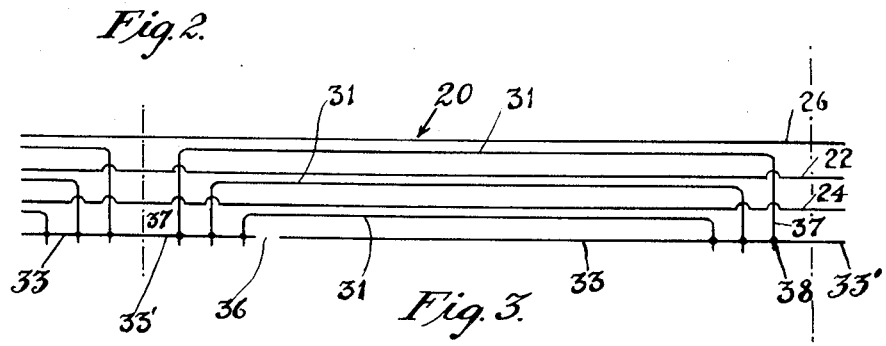
Figure 3 is an electrical diagram showing one bus duct section and a portion of an adjoining bus duct section constructed in accordance with the invention.

Beside the phase bus bars in each of the planes is placed a neutral plug-in bus bar 33, the neutral plug-in bus bars being wrapped with insulation 34. Suitable insulating spacers 35 are provided at intervals to maintain the neutral plug-in bus bars in the proper planes. Adjoining the end of each bus section as best seen in Figure 3 there is a break at 36 in the neutral plug-in bus bars and a second set of neutral plug-in bus bars 33' begins in prolongation of the first but separated from the first, running from the break 36 to the end of the section where it joins the neutral plug-in bus bars 33 of the next section.

Each of the neutral equalizer bus bars 31 at each end of the bus duct section has a bent portion or cross connection 37 which is electrically connected at 38 to the neutral plug-in bus bars 33 at one end and to the neutral plug-in bus bars 33' at the other end of the bus section. The cross connections are of course insulated from the phase bus bars.

On the phase bus bars and the neutral plug-in bus bars insulation is removed at various areas 40 along the length of the bus duct where openings 41 in the housing are provided for plug-in connectors as well known in the art which permit connecting to the phase bus bars and to the neutral plug-in bus bar on that side. The openings 41 are suitably protected as well known.

In operation, it will be evident that between each pair of phase bus bars in the different planes and in close proximity thereto, spaced from the phase bus bar by a distance which in the preferred embodiment does not exceed one-half inch, there is a neutral equalizer bus bar and the neutral equalizer bus bar at both ends is connected to the neutral plug-in bus bar. The neutral plug-in bus bar is interrupted so that any current which flows through the neutral plug-in bus bar is diverted through the neutral equalizer bus bars for the different phases.

Accordingly it is evident that very excellent balance of voltage between phases and neutral is obtained.

Figure 2:
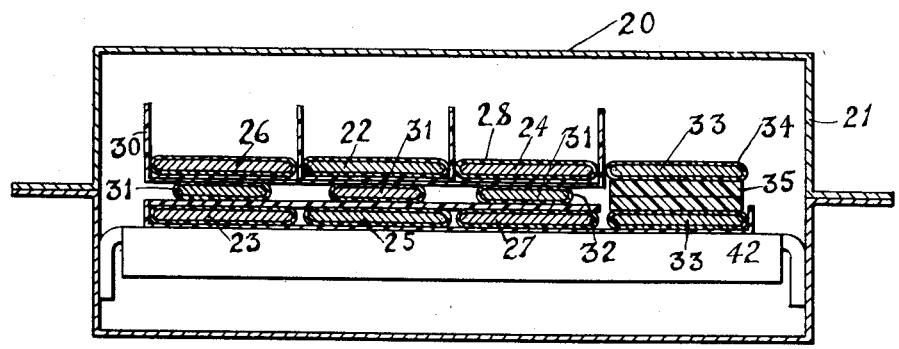
Figure 2 is a section on the line 2—2 of Figure 1 to enlarged scale.

The detail of the construction by which the bus bars are held in the bus duct housing is unimportant from the standpoint of the present invention. I illustrate in Figure 2 a metallic bracket 42 which is secured to the housing and insulated from the bus bars but supports them and also metallic clamps 43 which are secured to the housing and engage the insulation on both sides of the bus bars at points remote from the plug-in.

It will be evident of course that the bus bars including the neutral equalizer bus bars and the neutral plug-in bus bars will be of any suitable metal such as copper or aluminum or their alloys, and in fact the neutral equalizer bus bars can if desired be produced in a group from sheet as a stamping.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. A polyphase bus duct section comprising a plurality of polyphase bus bars grouped together in side by side relation in a plurality of planes, there being one bus bar from each of the phases in each of the planes, a neutral plug-in bus bar beside the phase bus bars in each of the planes, and neutral equalizer bars between each of the phase bus bars in the different planes connected at opposite ends of the section to the neutral plug-in bus bars, the phase bus bars and the neutral plug-in bus bar of each plane being constructed and arranged for plug-in connection.

2. A bus section comprising 3-phase bus bars arranged side by side in two different planes, there being a phase bus bar of each phase in each of the planes, a neutral plug-in bus bar beside the phase bus bars in each of the planes and neutral equalizer bus bars arranged between and insulated from each pair of phase bus bars in the different planes and connected near the ends of the section to the neutral plug-in bus bars.

3. A bus section for electrical distribution comprising phase bus bars arranged side by side in a plurality of planes, said phase bus bars being insulated from one another, first neutral plug-in bus bars arranged beside the phase bus bars in each of the planes and extending from one end of the bus section to a position adjoining the opposite end but short of the opposite end, second neutral plug-in bus bars arranged beside the phase bus bars and in said planes adjoining said other end of the section but separated from the first neutral plug-in bus bars, and neutral equalizer bars positioned between each pair of phase bus bars in the different planes, insulated therefrom and connected at one end of the section to the first neutral plug-in bus bars and at the other end of the section to the second neutral plug-in bus bars, the phase bus bars and the first neutral plug-in bus bars being constructed and arranged for plug-in connection thereto.

4. In a 3-phase bus section, 3-phase bus bars arranged side by side, there being one bus bar of each phase in each of two planes, the phase bus bars in the different planes being arranged in pairs, the phase bus bars being insulated from one another, first neutral plug-in bus bars one in each plane beside the phase bus bars extending from one end of the section to a position adjacent to but short of the other end of the section, said first neutral plug-in bus bars being insulated from the phase bus bars, second neutral plug-in bus bars separate from the first neutral plug-in bus bars arranged beside the phase bus bars one in each plane adjacent said other end of the section and insulated from the phase bus bars, and neutral equalizer bus bars positioned between each pair of phase bus bars, insulated therefrom, connected at one end of the bus section to the first neutral plug-in bus bars and connected at the other end of the bus section to the second neutral plug-in bus bars, the phase bus bars and the first neutral plug-in bus bars being constructed and arranged for plug-in connection thereto.

No references cited.